US006659874B2

(12) United States Patent
Idaka

(10) Patent No.: US 6,659,874 B2
(45) Date of Patent: Dec. 9, 2003

(54) METHOD OF PERFORMING GAME, GAME SERVER AND CLIENT APPARATUS CONSTITUTING GAME SYSTEM FOR EXECUTING THE METHOD, AND RECORDING MEDIUM PROVIDED WITH PROGRAM FOR OPERATING THE GAME SERVER

(75) Inventor: Mitsuhira Idaka, Tokyo (JP)

(73) Assignee: Konami Corporation, Tokyo (JP)

( * ) Notice: Subject to any disclaimer, the term of this patent is extended or adjusted under 35 U.S.C. 154(b) by 94 days.

(21) Appl. No.: 09/961,267

(22) Filed: Sep. 25, 2001

(65) Prior Publication Data

US 2002/0052241 A1 May 2, 2002

(30) Foreign Application Priority Data

Sep. 25, 2000 (JP) .................................... P. 2000-289993

(51) Int. Cl.[7] ........................... A63F 13/00; A63F 9/24; G06F 17/00; G06F 19/00

(52) U.S. Cl. ............................. 463/42; 463/16; 463/17; 463/25; 463/26

(58) Field of Search ............................... 463/42, 16–20, 463/25–27, 13, 30, 31, 34; 273/138–139, 292, 293, 143 R, 121 B, 274, 148 R, 309

(56) References Cited

U.S. PATENT DOCUMENTS 5,975,528 A * 11/1999 Halaby ................... 273/148 R
6,264,560 B1 * 7/2001 Goldberg et al. ............. 463/42

* cited by examiner

*Primary Examiner*—Teresa Walberg
*Assistant Examiner*—Robert Mendoza
(74) *Attorney, Agent, or Firm*—Sughrue Mion, PLLC

(57) ABSTRACT

When a user desires to participate a roulette game performed in a site operated by a web server, the user participates himself in the game by use of a user terminal. Of the users, a user who has declared to be an owner can participate and play the roulette game as the owner. In contrast, a user who has participated the game as a player predict a number determined by a roulette wheel and bet chips. If no winning chips have hit, the chips betted in a layout table are paid to the owner. In contrast, if winning chips have hit, the amount of payout is computed, and the chips are paid to the player. If the amount of chips paid to the player is greater than the amount of chips betted in the layout table, chips are paid to the players from the chips possessed by the owner.

27 Claims, 8 Drawing Sheets

METHOD OF PERFORMING GAME, GAME SERVER AND CLIENT APPARATUS CONSTITUTING GAME SYSTEM FOR EXECUTING THE METHOD, AND RECORDING MEDIUM PROVIDED WITH PROGRAM FOR OPERATING THE GAME SERVER

BACKGROUND OF THE INVENTION

The present invention relates to a method for performing a game in which a game value is transferred between an owner and at least one player; a game server and at least one client apparatus connected to the game server to constitute a game system, and to be operated by a game participant; and a computer-readable recording medium provided with a program for operating a computer constituting the game server.

There has hitherto been employed a system which artificially reproduces a gambling game to be performed in a casino, such as roulette or blackjack, by executing a suitable computer program. For instance, there are mentioned a roulette game machine and a blackjack game machine, which are installed in an amusement arcade. In connection with the roulette game machine, a game participant; that is, a player, predicts the number that will come up on the roulette wheel and bets on the predicted number a gaming token or chip (i.e., a game value) possessed by the player. If the thus-betted number has hit, the player can receive a predetermined number of gaming tokens from the owner; i.e., the owner. In connection with the blackjack game machine, a game participant acts as a player and plays a match with the owner. When having won the match, the player can receive a predetermined number of gaming tokens from the owner.

In such a roulette game machine, the game participant can hitherto enter a game only as a player. In addition to the roulette game machine and the blackjack game machine, a poker game machine or the like has also been known. However, such a game machine also enables a game participant to enter a game only as a player.

SUMMARY OF THE INVENTION

It is therefore an object of the present invention to provide a game performing method and a game system, which can provide a new entertainment value to a game participant by adding a new game element to a game, wherein a game value is transferred between the owner and a player. Further, the present invention provides a game server and a client apparatus which is connected to the game server to constitute the game system, and is to be used by a game participant, and a computer-readable recording medium provided with a program for operating a computer constituting the game server.

In order to achieve the above object, according to the present invention, there is provided a method of performing a game in which game values are transferred between an owner and at least one player, comprising the steps of:

a) inputting a player entry request to a computer in which the game is executed via a network, the player entry request being issued from a game participant who wants to participate in the game as a player;

b) inputting an owner entry request to the computer via the network, the owner entry request being issued from a game participant who wants to participate in the game as an owner;

c) determining an owner from at least one game participant who has issued the owner entry request, in accordance with a predetermined owner requirement;

d) receiving a first amount of game values and a player-payout requirement used in the game from the game participant who has issued the player entry request;

e) executing the game while involving the player participated in the step a) and the owner determined in the step c);

f) judging whether the player satisfies the player-payout requirement, after the step e) is finished;

g) paying out a second amount of game values to the player who satisfies the player-payout requirement, the second amount of game values being determined in accordance with the first amount of game values and the player-payout requirement; and h) paying out at least a part of a total amount of the first game values received in the step d) to the owner, in accordance with a predetermined owner-payment requirement.

In this method, a new game element; that is, the ability to enable entry of a user as the owner, is added to the game. There is attained an advantage of ability to provide new game entertainment value to game participants.

Furthermore, since information about game values of game participants can be concentrated on the computer, there is no necessity of taking into account the size and space of a machine, such as a related roulette machine installed in an amusement arcade. There is also attained an advantage of ability to develop a large-scale game involving a large number of participants.

In this method, an amount of game values possessed by a game participant can be used as the owner requirement in the step c).

In this method, depending on the kind of game, various player-payout requirements (step d) are conceivable. For instance, in the case of a roulette game, the player-payout requirements correspond to occurrence of a match between numbers where tokens serving as game values are bets and numbers determined by the roulette wheel. In the case of a blackjack game, hands of respective players to receive payouts must be closer to the number 21 than is the hand of a dealer.

In this method, depending on the kind of game, various methods are conceivable as payout methods to be employed in the step g). For instance, there are conceived a method of paying game values from all the game values received in the step d); a method of paying game values from the game values possessed by the owner; and a method of paying game values from the game values accumulately stored in the computer which effects progress in the game.

In this method, depending on the kind of game, various methods are conceivable as payout methods to be employed in the step h). It is determined in association with the payout method employed in the step g). For example, when a method of paying game values from the game values possessed by the owner is employed as a payout method for step g), there may also be employed a method of paying to the owner all game values received from players.

The computer is connected to the client apparatuses used by the game participants by way of the network. Data are exchanged between the game participants and the computer by way of the network. The network is not limited to a global network such as the Internet but may be a closed network which enables communication between specific persons or a network constituted within a limited space such as an amusement arcade. The method is embodied by the game system constituted through use of the network. As a result, a plurality of game participants-using a plurality of client apparatuses can participant the game by way of a network such as the Internet.

According to the invention, there is also provided a game system for performing a game in which game values are transferred between an owner and at least one player, comprising:

a game server, in which the game is executed;

at least one client apparatus, connected to the game server via a network to perform the game;

a player entry request sender provided in the client apparatus, which sends a player entry request from a game participant who wants to participate in the game as a player;

a player entry request receiver provided in the game server, which receives the player entry request;

an owner entry request sender provided in the client apparatus, which sends an owner entry request from a game participant who wants to participate in the game as an owner;

an owner entry request receiver provided in the game server, which receives the owner entry request;

an owner determinant provided in the game server, which determines an owner from at least one game participant who has issued the owner entry request, in accordance with a predetermined owner requirement;

a game value receiver provided in the game server, which receives a first amount of game values and a player-payout requirement used in the game from the game participant who has issued the player entry request;

a game-executer provided in the game server, which-executes the game while involving the game participant participated as the player and the game participant determined as the owner;

a game information provider provided in the game server, which provides information regarding the executed game to the client apparatus via the network;

a game information receiver provided in the client apparatus, which receives the game information provided from the game information provider;

a game presenter provided in the client apparatus, which presents the game information received by the game information receiver;

a player-payout requirement determinant provided in the game server, which judges whether the player satisfies the player-payout requirement in connection with the game executed;

a player-payout performer provided in the game server, which pays out a second amount of game values to the player who satisfies the player-payout requirement, the second amount of game values being determined in accordance with the first amount of game values and the player-payout requirement; and an owner-payout performer provided in the game server, which pays out at least a part of a total amount of the first game values received by the game value receiver to the owner, in accordance with a predetermined owner-payment requirement.

In this system, processing operations as same as those described the above can be performed. A game participant operates the client apparatus connected to the game server via the network, thereby outputting the player entry request or the owner entry request to the game server via the player entry request sender or the owner entry request sender. The player entry request receiver or the owner entry request receiver in the game server receives the request. Accordingly, a large number of game participants can participate the large-scale game via the network such as the Internet.

The game information may include images and sounds in connection with the executed game. The game information is provided to the client apparatus by way of the network through use of the game information provider so that the game participants can browse or play games through use of their client apparatuses.

According to the invention, there is also provided a game server for executing a game in which game values are transferred between an owner and at least one player, comprising:

a player entry request receiver, which receives a player entry request issued from a game participant who wants to participate in the game as a player;

an owner entry request receiver, which receives an owner entry request issued from a game participant who wants to participate in the game as an owner;

an owner determinant, which determines an owner from at least one game participant who has issued the owner entry request, in accordance with a predetermined owner requirement;

a game value receiver, which receives a first amount of game values and a player-payout requirement used in the game from the game participant who has issued the player entry request;

a game executer, which executes the game while involving the game participant participated as the player and the game participant determined as the owner;

a game information provider, which provides information regarding the executed game to the client apparatus via the network;

a player-payout requirement determinant, which judges whether the player satisfies the player-payout requirement in connection with the game executed;

a player-payout performer, which pays out a second amount of game values to the player who satisfies the player-payout requirement, the second amount of game values being determined in accordance with the first amount of game values and the player-payout requirement; and an owner-payout performer, which pays out at least a part of a third amount of game values to the owner, in accordance with a predetermined owner-payment requirement, the third amount of game values being a total amount of the game values received by the game value receiver.

When the game server is employed with the game system, the game participants can participate a game not only as players but also as the owner by way of the network.

Preferably, the owner-payout performer pays to the owner a part of a rest amount of game values obtained by subtracting a fourth amount of game values from the third amount of game values, where the fourth amount of game value is a total amount of the game values paid by the player-payout performer.

In this configuration, with a larger amount of game values received from the player and a smaller amount of game values paid to the player, the owner can receive a larger amount of game values. Particularly, when no player satisfies the player-payout requirements and no payout is performed, the owner can acquire all accepted game values. Thus, there can be developed a game in which the owner can expect high returns. Therefore, there is an advantage of ability to provide a higher degree of game entertainment.

Preferably, the player-payout performer pays out the second amount of game values from the third amount of game values.

In this configuration, a game can proceed such that the player and the owner attempt to acquire all the game values received from the player. Therefore, there is an advantage of ability to provide a higher degree of game entertainment to both of the player and the owner.

Here, it is preferable that the game server further comprises an overpayment determinant which judges the fourth amount of game values exceeds the third amount of game values. The player-payout performer pays out an excess amount of game values from game values possessed by the owner when the overpayment determinant judges the fourth amount of game values exceeds the third amount of game values.

In this configuration, when the total amount of game values to be paid to the player who satisfies the player-payout requirement has exceeded the total amount of game values received, the owner must pay, from his own game values, game values corresponding to an excess. Hence, a game participant who has become the owner can expect high returns with higher risks. Therefore, there is an advantage of ability to provide a higher degree of game entertainment to the participant acting as the owner.

Alternatively, it is preferable that the player-payout performer pays out the second amount of game values from game values possessed by the owner.

In this configuration, although the owner involves high risk, a confrontation between the player and the owner becomes definite. Therefore, there is an advantage of ability to provide a higher degree of game entertainment to both of the player and the owner.

Here, it is preferable that the game server further comprises a bonus presenter which presents bonus game values to the player when the second amount of game values exceeds the game values possessed by the owner.

In this configuration, in addition to an objective of game, such as satisfying the player-payout requirement during the game, the player is provided with a bonus awarded when the owner has gone bankrupt. Hence, there is an advantage of ability to provide a higher degree of game entertainment to the player.

Furthermore, it is preferable that the game server further comprises an acceptance amount limiter which delimits an upper limit of the first amount of game values in accordance with a predetermined acceptance requirement.

In this configuration, an upper limit of the second amount of game values can be limited. By limiting the second amount of game values, the amount of game values paid from the game values possessed by the owner is limited. Thus, the owner can be imparted with certain protection by setting predetermined reception requirement, as required. Depending on the mode or status of a game, various acceptance requirements are conceivable. For instance, a requirement for preventing the maximum amount of game values to be paid by the owner from exceeding the amount of game values possessed by the owner.

Here, it is preferable that the game server further comprises an upper-limit information receiver, which receives an upper limit information issued from the owner for determining the upper limit of the first amount of game values. The acceptance amount limiter utilizes the upper limit information as the acceptance requirement.

In this configuration, the upper limit of the amount of game values accepted from players can be limited on the basis of the owner's wishes. For instance, if the owner desires low returns with low risks, the upper-limit information may be set such that the maximum amount of game values paid by the owner does not exceed a portion of the amount of game values possessed by the owner. In contrast, if the owner desires high returns with high risks, the upper-limit information can be set such that the maximum amount of game values paid by the owner exceeds the amount of game values possessed by the owner. Hence, there is an advantage of ability to control the game, which is entertainment unique to the owner. There is also an advantage of ability to enable the owner to control risks.

Preferably, the owner requirement is that a participant who wants to participate the game as an owner has game values not less than a predetermined amount.

In this configuration, such a requirement poses a limitation on game participants who can become the owner, thereby enhancing the value of becoming the owner. Further, when game values are paid to the player from the owner, progress in a game may be hindered if the owner does not have a certain amount of game values. Even in such a case, the-above-described requirement enable smooth progress in a game.

Preferably, the game server further comprises:

- an acceptance termination request receiver, which receives an acceptance termination request from the owner to terminate a period in which the game value receiver receives the game values from the player; and
- an acceptance refuser, which refuses to receive the game values from the player when the acceptance termination request receiver receives the acceptance termination request.

In this configuration, the owner can control a progress in game by advancing or delaying progress of a game. There is an advantage of the ability to enable a game participant who has become the owner to enjoy entertainment, such as operation of progress of a game, which is unique to the owner and differs from that of the player.

According to the invention, there is also provided a client apparatus, connected to the above described game server via the network, comprising:

- a player entry request sender, which sends the player entry request;
- an owner entry request sender, which sends the owner entry request;
- a game information receiver, which receives the game information provided from the game information provider; and a
- a game presenter, which presents the game information received by the game information receiver.

When the client apparatus is employed with the game system set forth, game participants can participate the game by way of the network, not only as the player but also as the owner.

According to the invention, there is also provided a recording medium provided with a program read and executed by a computer which serves as a game server for executing a game in which game values are transferred between an owner and at least one player, the program causing the computer to perform the steps of:

a) receiving a player entry request to the computer in which the game is executed via a network, the player entry request being issued from a game participant who wants to participate in the game as a player;

b) receiving an owner entry request to the computer via the network, the owner entry request being issued from a game participant who wants to participate in the game as an owner;

c) determining an owner from at least one game participant who has issued the owner entry request, in accordance with a predetermined owner requirement;

d) receiving a first amount of game values and a player-payout requirement used in the game from the game participant who has issued the player entry request;

e) executing the game while involving the player participated in the step a) and the owner determined in the step c);

f) judging whether the player satisfies the player-payout requirement, after the step e) is finished;

g) paying out a second amount of game values to the player who satisfies the player-payout requirement, the second-amount of game values being determined in accordance with the first amount of game values and the player-payout requirement;

h) paying out at least a part of total amount of the game values received in the step d) to the owner, in accordance with a predetermined owner-payment requirement.

The program recorded on the recording medium is executed by a computer constituting the above described game server, for example, so that game participants can participate the game by way of the network, not only as the player but also as the owner.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION OF THE PREFERRED EMBODIMENTS

There will now be described an embodiment, wherein the present invention is applied to a game system for performing a roulette game.

The overall configuration of a game system according to the present embodiment will first be described.

Figure 2:
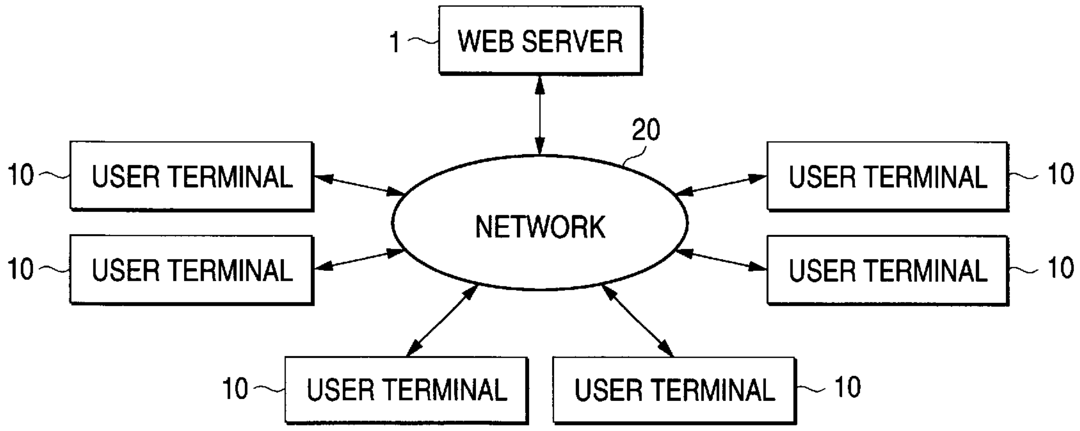
FIG. 2 is a block diagram schematically showing the overall configuration of the game system.

FIG. 2 is a block diagram showing the overall configuration of the game system according to the embodiment. The game system comprises a web server 1 and user terminals 10. The web server 1 is a game server which manages and controls a roulette game site and which performs a roulette game on the site. The user terminals 10 serve as client apparatus which can be connected to the Internet. The user terminals 10 can be connected to the web server 1 by way of a communication network 20 consisting of a public telephone line, a private telephone line, a cable television line, or a radio communication line, or the like. By way of the web server 1, a player can access a roulette game site opened on the Internet. Various data sets exchanged between the web server 1 and the user terminals 10 are transferred in the form of a computer data signal embodied as a predetermined carrier wave and by way of the communication network 20 serving as a transmission medium.

The constitution of the web server 1 constituting the game system will now be described.

Figure 3:
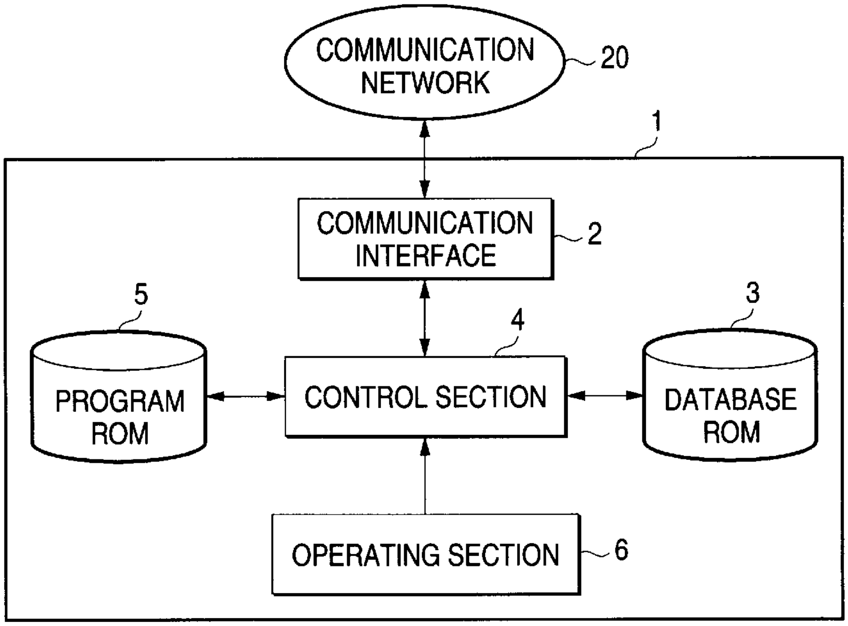
FIG. 3 is a block diagram schematically showing the configuration of a web server constituting the game system.

FIG. 3 is a block diagram showing the configuration of the web server 1. The web server 1 comprises a communication interface 2; a database ROM 3 having various databases stored therein; a control section 4 for controlling individual sections of the web server 1; a program ROM 5 serving as a recording medium provided with a program to be executed by the control section 4; and an operating section 6 to be operated by an operator. The communication interface 2 also constitutes game information distributor. A general-purpose computer or a workstation may be utilized as the web server 1. However, a portion of the web server may be managed and operated by a provider.

The database ROM 3 stores a user information database, an odds table, and a roulette probability table. The user information database includes data pertaining to the amount of chips, which corresponds to game values owned by each user (i.e., a game participant). The odds table describes a correlation between a place betted by a player and odds thereat. The roulette probability table describes a correlation between 38 numbers prepared for determining a winning number and the probability of occurrence of the number. The database ROM 3 may be constituted of the same ROM that is used for constituting the program ROM 5.

The program ROM 5 stores various programs to be executed by the control section 4. The programs are loaded in accordance with an instruction issued by the control section 4. The program ROM 5 stores a site operation program for managing and operating the roulette game site, a game execution program for performing a roulette game to be performed on the site, a communication program for exchanging data by way of the communication network 20, and a program required for the web server 1 to perform processing.

The control section 4 is constituted of at least one computing unit for temporarily storing program data, such as a CPU and a RAM. The control section 4 loads a predetermined operating system (OS) stored in the program ROM 5 and activates and controls the web server 1. The control section 4 executes programs recorded on the program ROM

5 and performs processing in accordance with the program. Alternatively, the control section 4 may be provided with a plurality of computing units for executing programs, such as CPUs, and the respective computing units may execute programs in a distributed manner.

The configuration of the user terminal 10 constituting the game system will now be described.

Figure 4:
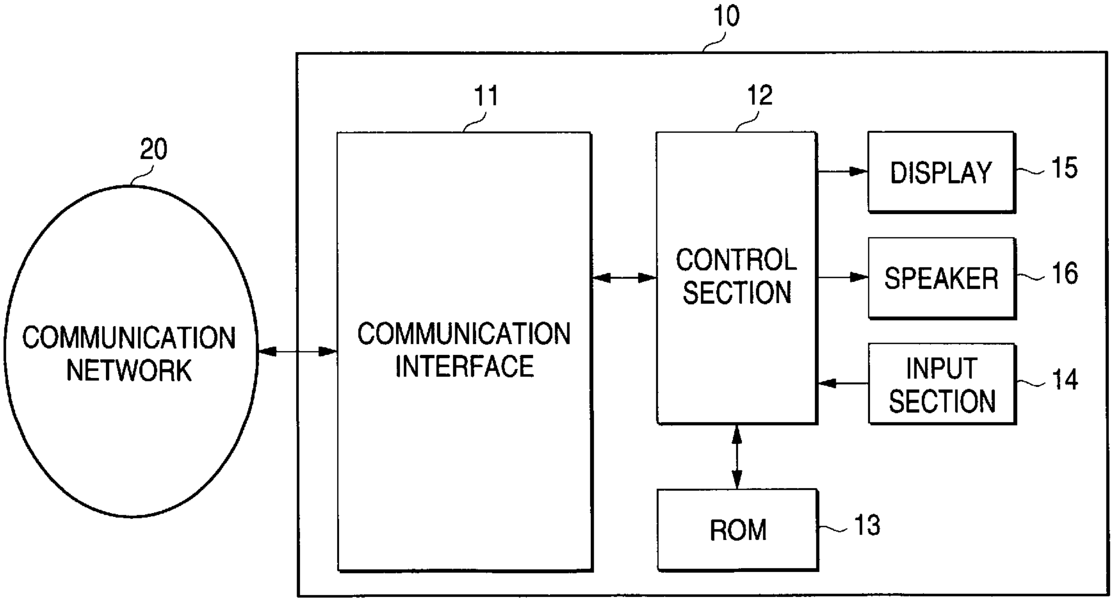
FIG. 4 is a block diagram schematically showing the configuration of a user terminal constituting the game system.

FIG. 4 is a block diagram showing the schematic configuration of the user terminal 10. The user terminal 10 is a terminal for accessing a roulette game site operated by the web server 1, thereby enabling a user to enter a roulette game performed in the site. A general-purpose personal computer which has recently become pervasive in the home can be used as the user terminal 10. A home game machine, a home electrical appliance such as a TV set, or mobile communication gear such as a portable cellular phone can be employed as the user terminal 10, so long as the device can be connected to the Internet and can access the roulette gaming site, to thereby enable required operations and processing.

The user terminal 10 comprises a communication interface 11; a control section 12 for controlling individual sections; a ROM 13 for recording a program executed by the control section 12; an input section 14 which inputs various requests when operated by a player; a display 15; and a speaker 16. The communication interface 11 is constituted of a terminal adapter for exchanging data by way of the communication network 20 and serves as a player participation request sender, an owner participation request sender, and a game information receiver. The display 15 constitutes a game information provider which displays image data acquired from the web server and other display data sets. The speaker 16 also constitutes the game information provider which outputs audio data acquired from the web server 1 and other audible data sets. In the present embodiment, the input section 14 is constituted of a keyboard and a mouse. In lieu of the speaker 16, a headphone or an earphone may also be employed.

The ROM 13 stores a communication program used when the user accesses the roulette game site run by the web server 1, and a browsing program used for browsing a roulette game performed in the web site. Programs stored in the ROM 13 are performed by the control section 12. Commercially-available or distributed browsing software (i.e., a, browser) can be used as the browsing program.

The control section 12 has the same configuration as that of the control section 4 of the web server 1. The control section 12 loads the OS stored in the ROM 13, thereby activating and controlling the user terminals 10. The control section 12 executes programs recorded in the ROM 13, thereby performing processing in accordance with the programs.

Through use of the game system, there will be described a flow of processing of a roulette game in which a plurality of users enter the game as players or the owner. Provided that a user using a user terminal 10*a* acts as the owner and that users using other user terminals 10*b* act as players, the following descriptions describe a case where a roulette game is played in a roulette game site.

Figure 1:
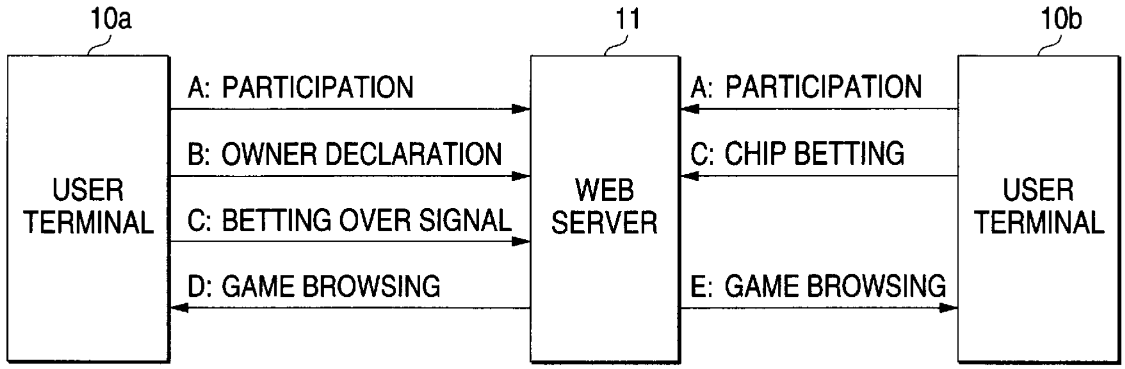
FIG. 1 is a descriptive view showing the flow of processing of a game system according to an embodiment of the invention.

FIG. 1 is a descriptive view showing the flow of processing of the game system according to the present embodiment. In relation to the game system, the users access the roulette game site through use of the user terminals 10*a* and 10*b*, thereby making an entry into the web server 1 (step A). A user who is to act as the owner performs an owner declaration to be described later (step B). Users who desire to enter the game as players bet chips on a roulette game performed by the web server (step C). The, user terminal 10*a* of the user who acts as the owner outputs a betting over signal (step D). The players have finished betting chips, and one winning number is then determined by a roulette wheel. The status of the roulette wheel can be browsed by the user terminals 10*a* and 10*b* (step E).

Figure 5A:
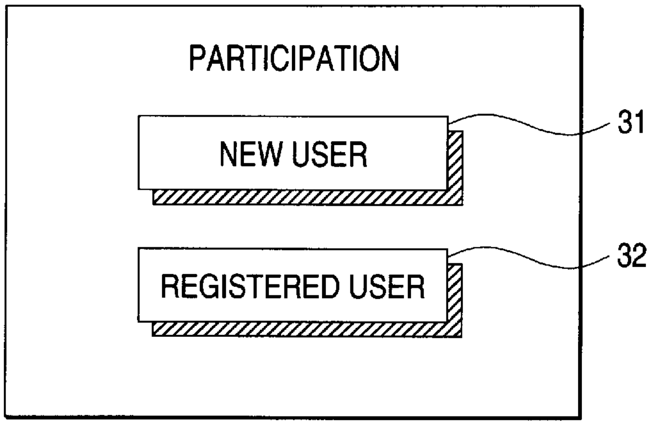
FIG. 5A is a descriptive view showing a participation screen appearing on the user terminal.

Users who desire to enter a roulette game performed in the roulette game site use as the user terminals 10*a* and 10*b*, e.g., their personal computers located in their homes. The users then access the roulette game site run by the web server 1. When the user has accessed an entry application page prepared on the roulette game site, a participation screen shown in FIG. 5A appears on the display 15. Provided on the participation screen are a new user button 31 for a user who participates for a roulette game for the first time and a registered user button 32 for a user who has previously participated for roulette games.

Figure 5B:
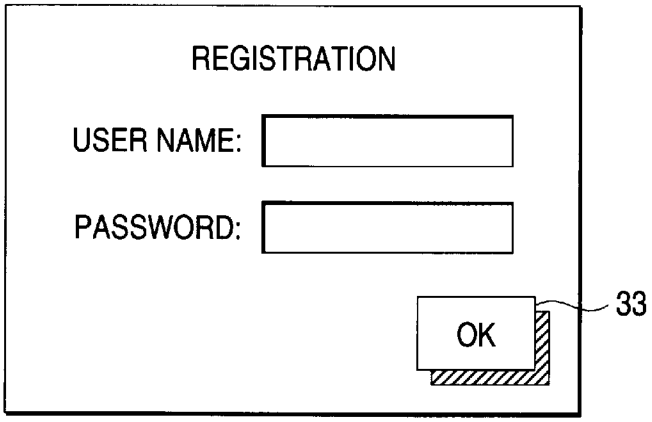
FIG. 5B is a descriptive view showing a registration screen appearing on the user terminal.

A user who enters a roulette game for the first time clicks the new user button on the participation screen for effecting user registration, by operating a mouse constituting the input section 14. Then, a registration screen shown in FIG. 5B appears on the display 15. On the registration screen, the player enters, by way of a keyboard section 14, a user name to be used in the course of a game and a password to be used when the player utilizes, for the next and subsequent games, the data pertaining to the amount of chips remaining from the previous game. After having finished entering data for predetermined entry items, the user clicks an OK button 33 appearing on the registration screen. The control section 12 for executing a communication program outputs entry items by way of the communication interface 11. The entry items are transmitted to the web server 1 by way of the communication network 20.

The web server 1 links together the entry items received by way of the communication interface 2, by the control section 4 for executing a user registration program recorded on the program ROM 5. The thus-linked entry items are registered into a user information database recorded in the program ROM 5. After completion of registration, a game start screen shown in FIG. 5D is output to the user terminals 10*a* and 10*b*.

Figure 5C:
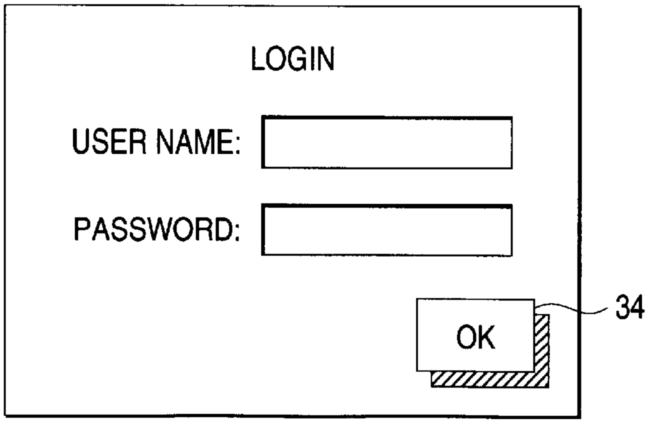
FIG. 5C is a descriptive view showing a login screen appearing on the user terminal.

The user who has completed registration in the past clicks the registered user button 32 appearing on the participation screen. Accordingly, a login screen shown in FIG. 5C appears on the display 15. The login screen is identical in configuration with the registration screen shown in FIG. 5B. As in the case of the registration screen, after having finished entering a user name and a password, the user clicks an OK button 34. The thus-entered items are transmitted to the web server 1. Upon receiving the input items, the web server 1 loads a password from the user information database stored in the database ROM 3 on the basis of the received user name, by the control section 4 which performs an entry acknowledgement program recorded in the program ROM 5. The thus-loaded password is matched with the received password. If a match is found, the game start screen shown in FIG. 5D is output to the user terminal 10*a* or the user terminal 10*b*. In contrast, if no match is found, a message "Password is incorrect" is output to the user terminal 10*a* or the user terminal 10*b*.

Figure 5D:
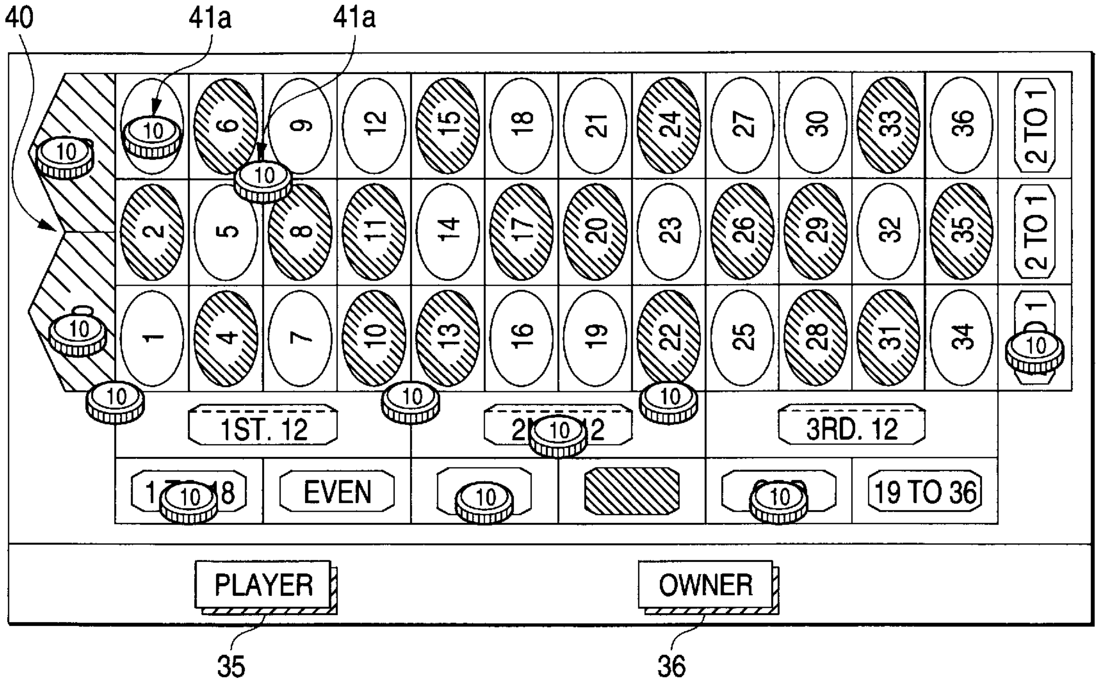
FIGS. 5D and 5E are descriptive views showing a game start screen appearing on the user terminal.

The game start screen shown in FIG. 5D appears on the display 15 of each of the user terminals 10*a* and 10*b* of the users who have finished user registration and entry acknowledgement. The game start screen is a descriptive screen for describing odds and areas on which players can bet chips.

Figure 5E:
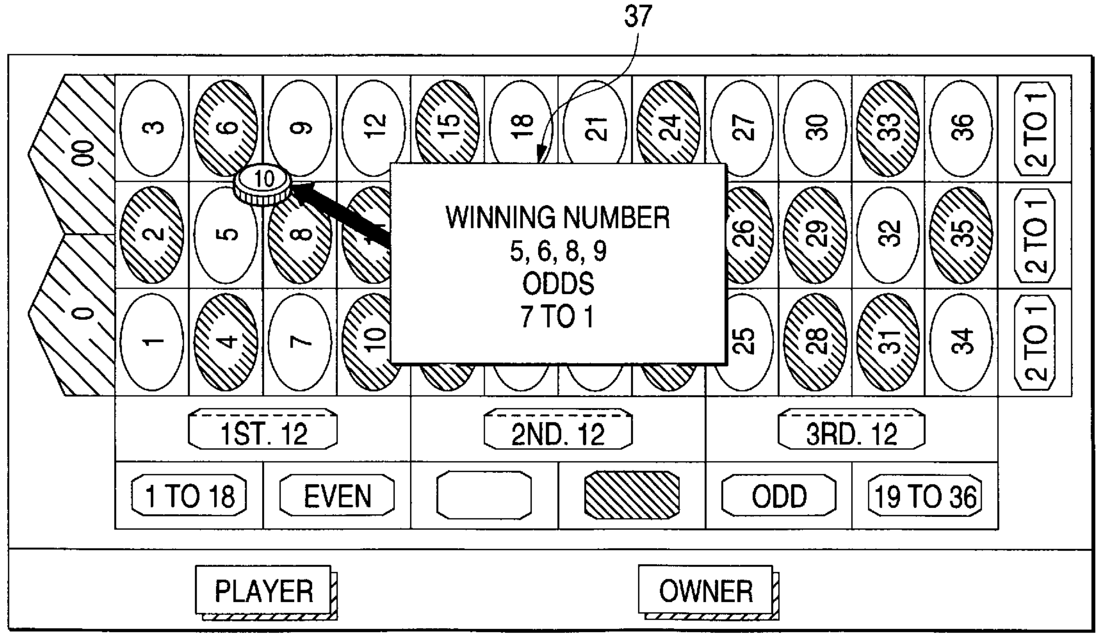

Displayed on the game start screen is an image showing that demonstration chips 41*a* are located in areas of a layout table 40 where players can bet chips. When a user clicks, e.g., the demonstration chip 41*a* by operating a mouse constituting the input section 14 on the game start screen, a click signal representing that the demonstration chip 41*a* has been selected is sent to the web server 1. As a result, the winning number(s) and odds, such as those shown in FIG. 5E, are displayed on an explanation frame 37 on the display 15.

Figure 6A:
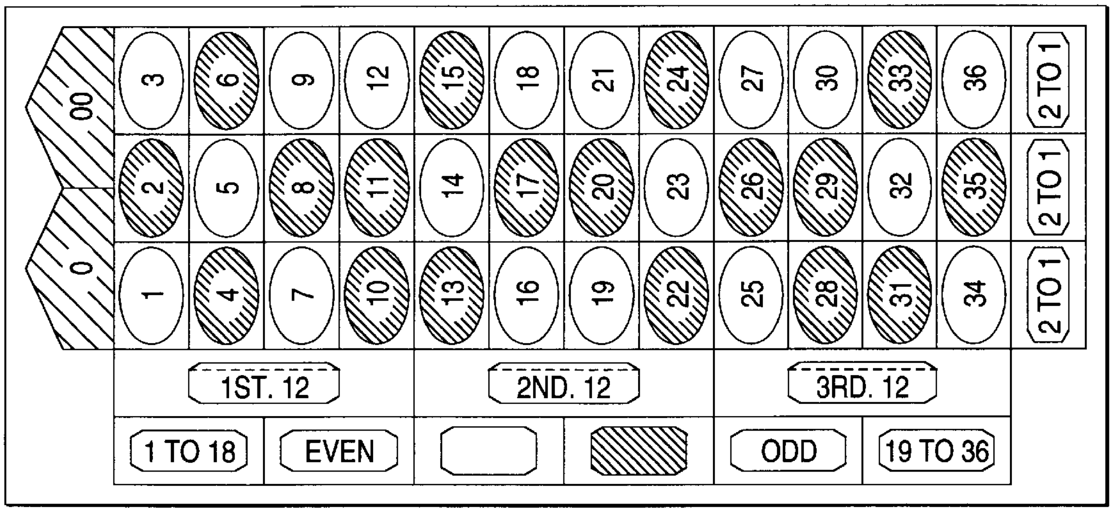
FIGS. 6A and 6B are descriptive views showing a betting screen appearing on the user terminal.

When the user using the user terminal 10*b* enters for the game as a player, the user clicks a player button 35 on the game start screen shown in FIG. 5D. The user terminal 10*b* then sends a player entry signal to the web server 1 as a player entry request. Upon receipt of the player entry signal, the web server 1 deems the user using the terminal 10*b* as a player. A betting screen commonly used among the user terminals 10 is output to the user terminal 10*b*. As a result, the betting screen shown in FIG. 6A appears on the display 15.

The user who uses the user terminal 10*a* and desires to act as the owner must click an owner button 36 on the game start screen shown in FIG. 5D. The owner button 36 becomes effective only when the control section 4 of the web server 1 acting as an owner determinant has determined that the amount of chips owned by the user is equal to or greater than US$50,000, which is a requirement for acting as the owner. More specifically, only a user having chip amount data pertaining to US$50,000 or greater recorded in the user information database stored in the database ROM 3 can click the owner button 36. In the present-embodiment, only a user possessing a chip amount of US$50,000 or more is granted a right to act as the owner. The user earns chips by playing roulette games as a player, thereby satisfying the requirement for acting as the owner.

When the user granted a right to act as the owner clicks the owner button 36, an owner declaration signal is sent to the web server 1 as an owner entry request. As a result of receiving the owner declaration signal, the web server 1 deems the user who uses the user terminal 10*a* to be the owner. In the present embodiment, only one user is allowed to act as the owner for one roulette game. If a certain user has already declared the owner, the control section 4 which executes the declaration determination program nullifies the owner button 36 appearing on a user terminal 10 of any other user who also possesses a chip amount of US$50,000 or more.

An unillustrated and predetermined owner declaration screen appears on the user terminal 10*a* of the user who has been deemed to be the owner. A betting screen to be displayed on the displays 15 of the user terminals 10*b* used by the players is also displayed on the owner declaration screen. The owner can ascertain the betting status of all the players. In accordance with a predetermined operation of the owner, owner declaration processing to be described later is executed.

Figure 6B:
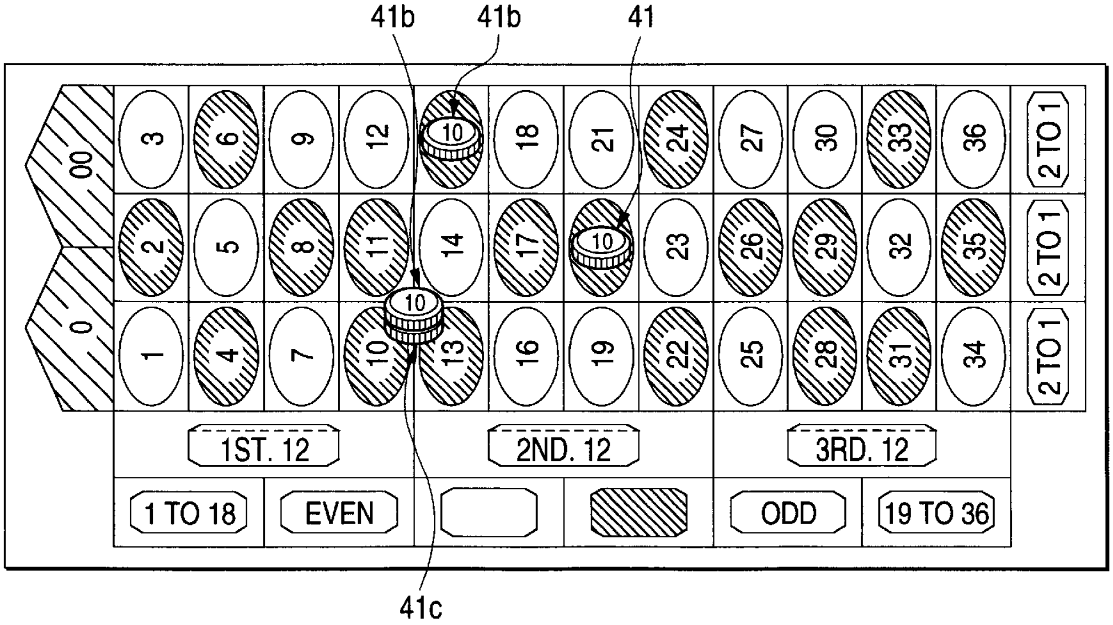

After having completed the participation, the player actuates a mouse constituting the input section 14 on the betting screen appearing on the user terminal 10*b* of the user who has previously entered for the game as a player. When the player has clicked, for example, the number 20 to designate. a single-number betting, a corresponding chip betting signal is sent to the web server 1. The number of chips is incremented every time clicking is performed. When the number of chips has exceeded the maximum bet, the chip status returns to a status of no bet. If a chip betting signal is transmitted every time clicking is effected, the traffic of data communication is increased. In order to prevent occurrence of an increase in traffic, all the chip betting signals may be collectively transmitted through a single transmission. After receiving the chip betting signal, the web server 1 causes the control section 4 acting as a game value accepter to decrease the chip amount data pertaining to the player who has sent the chip betting signal, by an amount corresponding to the chips betted. The bet information based on the chip betting signal is output to the user terminal 10*b* that has transmitted the chip betting signal as well as to the remaining terminals 10, including the owner terminal 10*a*. As shown in FIG. 6B, the betting screens appearing on the displays 15 of the respective user terminals 10 are updated such that a player chip 41 of the sender of the chip betting signal is displayed on the number 20. The players and the owner ascertain the chips 41*b* and 41*c* betted by all the players participated in the game, thus grasping the betting status of the entire layout table.

Next will be described a flow of control processing performed by the control section 4 which executes a game execution program serving as a game executor.

Figure 7:
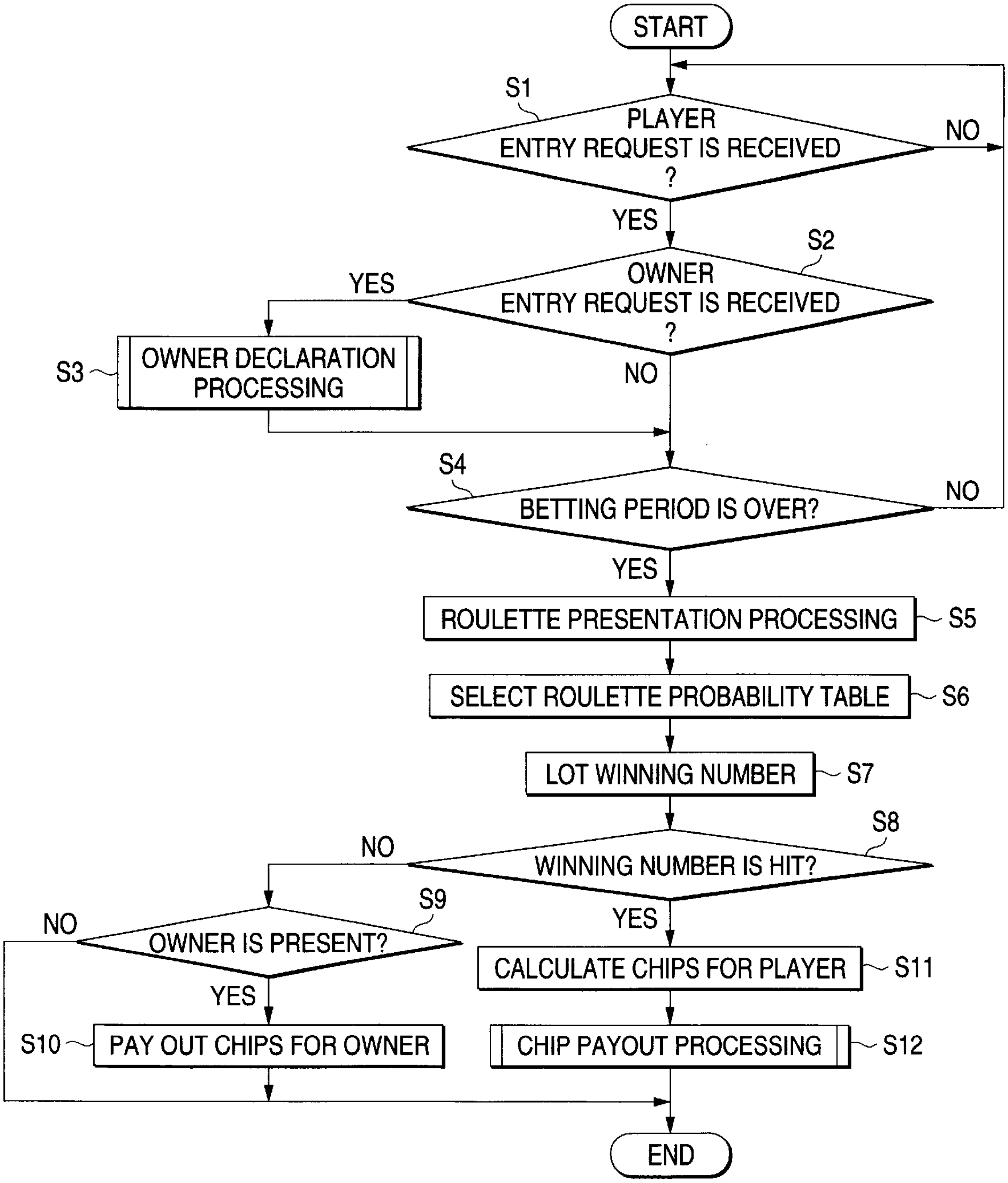
FIG. 7 is a flowchart showing the flow of control processing of a roulette game performed by a control section of the web server.

FIG. 7 is a flowchart showing the flow of control processing of the roulette game performed by the control section 4 of the web server 1. When the user has clicked the player button 35 appearing on the game start screen shown in FIG. 5D through the above-described participating operation, the web server 1 receives a player entry signal. As a result, the control section 4 determines that the player has participated the game (S1). Other users can participate for the game in midstream.

When the user who has first entered in the game has clicked the player button 35 shown in FIG. 5D, a betting period during which the player can bet is commenced. If the current round of the game is now being played continuously so as to follow the previous round of the game, a betting period is commenced immediately after end of the previous round of the game. During the betting period, the players who have participated in the game can bet their chips on areas associated with their predicted numbers, by actuating a mouse while viewing the displays 15 of their user terminals 10*b*. When the betting period has elapsed (S4), the control section 4 acting also as an acceptance refuser outputs a betting over signal to the user terminals 10*b* of all the players from the web server 1. As a result, a screen stating that the betting period is over appears on the displays 15 of the user terminals 10, thereby prohibiting betting operation of a mouse.

During the betting period, the user clicks the owner button 36 on the game start screen, which screen is shown in FIG. 5D and appears on the display 15 of the user terminal 10*a*, thereby declaring the owner. The user terminal 10*a* then sends an owner declaration signal to the web server 1. The control section 4 of the web server 1 that has received the owner declaration signal determines that the owner declaration has been effected (S2). When the owner declaration has been effected, the control section 4 executes owner declaration processing to be described later (S3), thereby determining whether to grant the user of the user terminal 10*a* as the owner.

After lapse of the betting period (S4), the control section 4 executes roulette presentation processing in accordance with a game execution program (S5). During the roulette presentation processing, presentation images and associated sound or sound data, which are to be provided from the time a spinning ball is released until the ball is tossed into the rotating roulette wheel and a winning number is determined, are output to the respective user terminals 10. As a result, presentation images appear on the displays 15 of the respective user terminals 10. Moreover, sound and voice are emitted from the speaker 16, thereby enhancing presence.

The control section 4 that has commenced the roulette presentation processing selects a roulette probability table to be used for the current round of game from among the roulette probability tables recorded in the database ROM 3 (S6). If there is no owner, a roulette probability table which has already been prepared for a game not involving the owner is selected. If the game involves the owner, selection of a roulette probability table is effected on the basis of result of owner declaration processing to be described later. If the roulette probability table has been selected, lotting processing is executed for determining a winning number to appear on the roulette wheel (S7). Through the lotting processing, random numbers for lotting are generated. In light of the selected roulette probability table, one number (winning number) is selected from 38 numbers from 1 through 36, 0, and 00, on the basis of the thus-generated random numbers.

On the basis of the thus-determined winning number, the control section 4 changes a presentation image to be displayed on the display 15 of each of the user terminals 10. A presentation image showing that a ball falls into the determined winning number appears on the display 15 of each of the user terminals 10, thereby informing the players and-the owner of the number selected by the roulette wheel.

Once the number has been determined through the lotting processing, the control section 4 acting as a player-payout-requirement determinant determines whether or not winning chips are placed on the layout table 40 (S8). If it is determined that no winning chips are placed on the layout, a determination is made as to whether or not the game involves the owner (S9). If it is determined that the owner is involved, the control section 4 acting as an owner-payout performer performs processing for paying out chips to the owner (S10). During the processing for paying chips to the owner, chips are paid to the owner on the basis of the result of owner declaration processing to be described later. The amount of chips is determined by subtracting an amount of chips corresponding to an entry fee from a total amount of chips (a total amount of accepted chips) betted by the players (subtraction is one of the predetermined requirements for paying out chips to the owner). More specifically, data pertaining to the amount of chips to be paid to the owner are added to the chip amount data pertaining to the owner registered in the user information database. If it is determined that there are no winning chips, the control section 4 which performs roulette presentation processing outputs a no-payout presentation image to the user terminals 10*b* of all the players. The presentation image appears on the display 15 of each of the user terminals 10*b*.

If in step S8 it is determined that winning chips are placed in the layout table 40, the control section 4 performs payout computation processing (S11). Through payout computation processing, winning chips are acknowledged for each player. The amount of payout to be paid to an individual player is computed, through use of the odds table recorded in the database ROM 3. Subsequently, the control section 4 acting as player-payout performer and the owner-payout performer performs chip payout processing to be described later (S12), thereby paying chips to players or the owner, as required. When chips are paid to players, chip amount data corresponding to the amount of chips to be paid are added to the chip amount data pertaining to an individual player registered in the user information database. At this time, the control section 4 which performs roulette presentation processing outputs a presentation image of a dealer who pays chips to the user terminal 10*b* of the player who is to receive a payout. The presentation image and the amount of payout appear on the display 15 of the user terminal 10*b*. At this time, a no-payout image display appears on the displays 15 of the players who have lost.

Next, there will be described the owner declaration processing (S3) to be performed when an owner declaration is effected.

Figure 8:
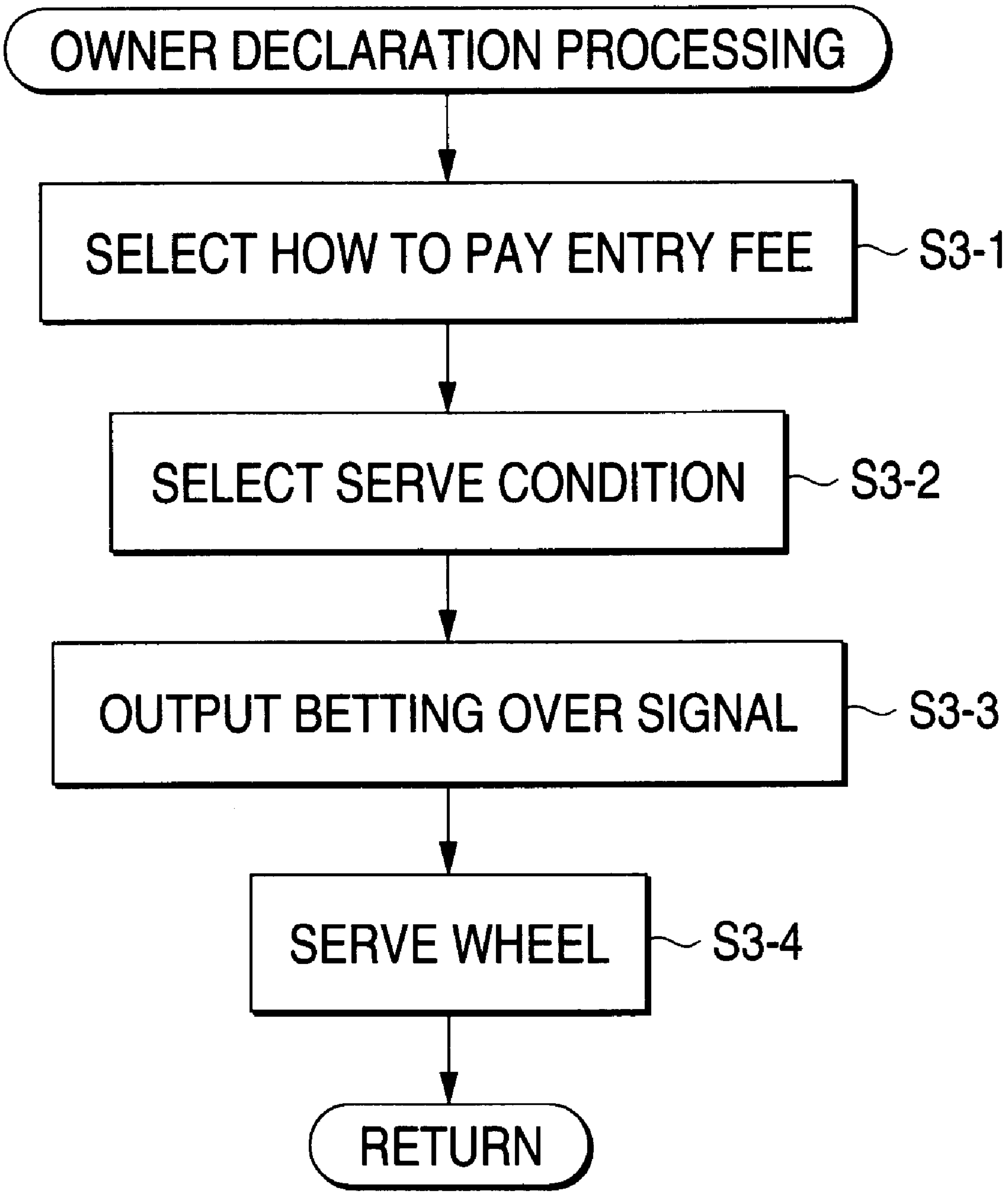
FIG. 8 is a flowchart showing the flow of owner declaration processing performed by the web server.

FIG. 8 is a flowchart showing the flow of owner declaration processing. From his chips, the owner must pay chips as an owner entry fee to the operator of the roulette game site. First, the owner selects how to pay an entry fee while ascertaining the betting statuses of all the players on the owner declaration screen. In the present embodiment, the owner selects either an prepayment for paying chips corresponding to US$2,000 before a game is started or a deferred payment of paying 10% of a total amount of chips betted in the layout table 40 for the current round of game in which the user is to enter as the owner (S3-1). If a total amount of chips betted in the layout table 40 is large, the user should select the prepayment. In contrast, if the total amount of chips betted in the layout table 40 is small, the user should select the deferred payment. To do so, the user can increase his profits.

When the prepayment is selected, chip amount data corresponding to US$2,000 are subtracted, at this point in time, from the chip amount data pertaining to the user recorded in the user information database of the database ROM 3. During the processing of paying out chips to the owner (S10), the total amount of chips betted in the layout table 40 are all paid out to the owner. In contrast, if the deferred payment method has been selected, chips determined by subtracting 10% from the total amount of chips betted in the layout table 40 are paid to the owner during the processing for paying chips to the owner in step S10.

When the method of paying an entry fee has been selected, a serve condition selection screen to be used for selecting a rotation speed of a roulette wheel and a speed for tossing a ball into the wheel appears on the display 15 of the user terminal 10*a* of the owner. The owner actuates the input section 14, such as a mouse, and selects the rotation speed of the wheel and the speed for tossing the ball into the wheel (S3-2). Information about the thus-selected various serve conditions is transmitted to the web server 1 and utilized as requirements for roulette presentation processing and those for selecting a roulette probability table.

After selection of serve conditions has been completed, an unillustrated betting over screen on which a betting over button for completing a betting period appears on the display 15. Since the betting screen displayed on the display 15 of the user terminal 10*b* of the player appears on the betting over screen, the owner clicks the betting over button after having ascertained the betting status. A betting over signal serving as a betting over request is output to the control section 4 of the web server 1 serving as an acceptance termination request receiver (S3-3). In step S4 shown in FIG. 7, the control section 4 acting as the acceptance refuser determines that a betting period has elapsed.

If the betting period has been over in the manner as mentioned above, an unillustrated serve screen appears on the display 15*a* of the user terminal 10*a* of the owner. Image data are output from the web server 1 so as to effect display of images such as a dealer's hand moving as if serving the ball, and a spinning wheel. The owner clicks a serve button appearing on the serve screen in accordance with the degree of backswing corresponding to a desired strength and the spinning position of the wheel by a timing at which the owner operates a touch panel, thereby selecting a strength for serving the ball and a timing at which the serve is to be made. A serve signal output by clicking action is sent to the web server 1. Upon receipt of the serve signal, the control section 4 performs a serve (S3-4). On the basis of information about the timing and strength of the serve, the control section 4 also performs roulette presentation processing and selection of a roulette probability table.

When having performed a serve in the manner mentioned above, the control section 4 selects a predetermined roulette probability table from among roulette probability tables recorded in the database ROM 3, through selection of the roulette probability table in step S6 shown in FIG. 1, in accordance with the rotation speed of the wheel, the tossing speed of the ball, and the timing at which the ball is to be tossed, which have been selected by the owner.

In the present embodiment, there is employed a method of selecting a roulette probability table to be used for a current round of game from among a plurality of roulette probability tables which have been prepared in advance, in accordance with serve conditions. Contents of a roulette probability table may be changed in accordance with serve conditions. Alternatively, the owner is prohibited from selecting serve conditions, and the same roulette probability table may be employed indiscriminately regardless of presence of the owner.

Next will be described chip payout processing (S12) to be performed by the control section 4 acting as the player-payout performer and the owner-payout performer when winning chips are present in the layout table 40.

Figure 9:
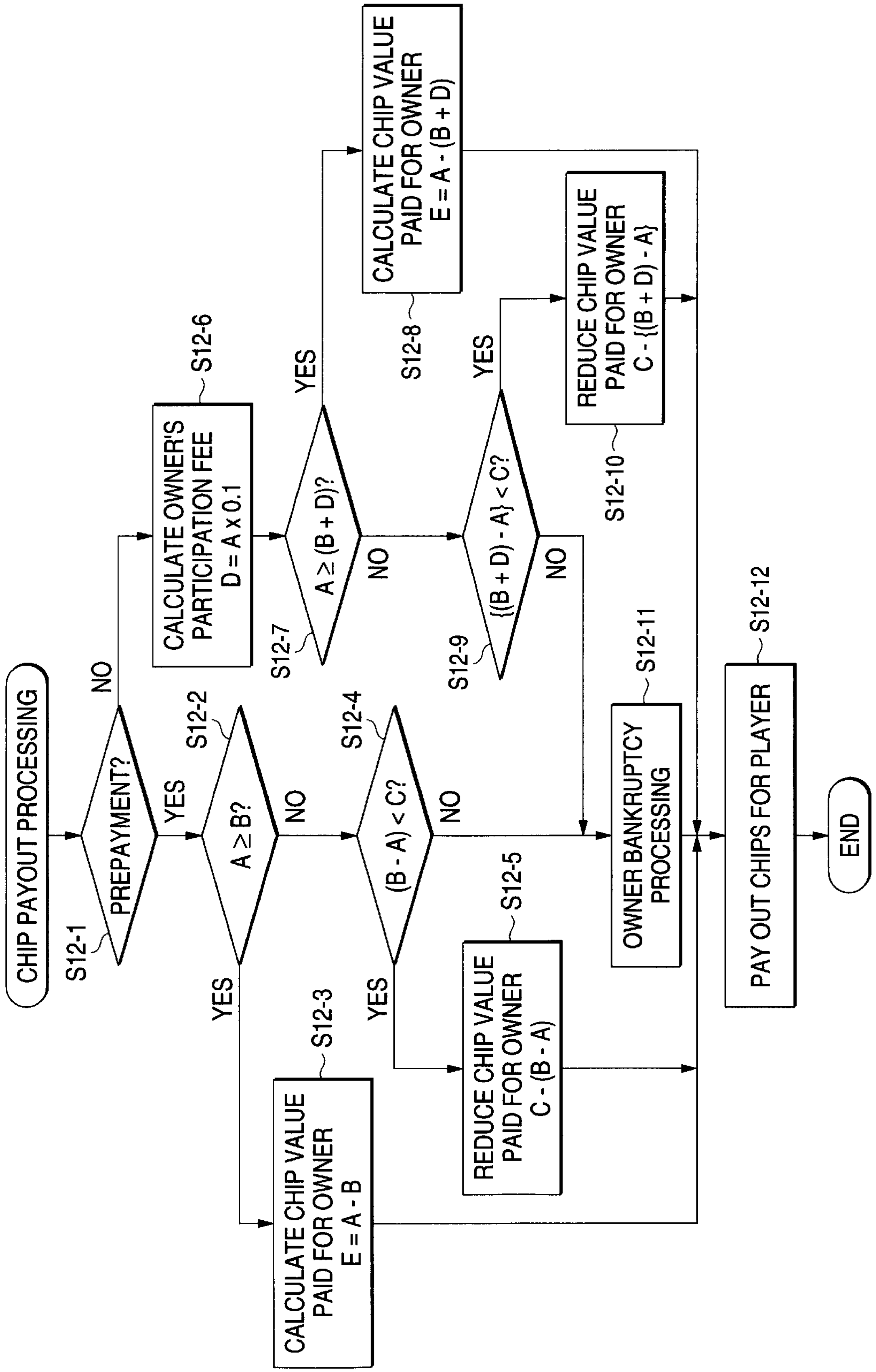
FIG. 9 is a flowchart showing the flow of chip payout processing performed by the web server.

FIG. 9 is a flowchart showing the flow of chip payout processing. In the drawing, reference symbol A denotes a total amount of chips betted in the layout table 40; B denotes a total amount of chips to be paid to all the players (i.e., a total amount of payout); C denotes a total amount of chips possessed by the owner; D denotes an amount of chips to be paid as an entry fee in accordance with a deferred payment; and E denotes the amount of chips acquired by the owner.

During the chip payout processing pertaining to step S12 shown in FIG. 7, in step S3-1 shown in FIG. 8 a determination is made as to whether or not an entry fee is prepaid (S12-1). If it is determined that the entry fee is prepaid, the control section 4 acting as an overpayment determinant determines whether or not the total amount of chips A betted in the layout table 40 is greater than the total amount of chips B to be paid to all the players calculated through the payout computation performed in step S11 shown in FIG. 7 (S12-2). Here, if it is determined that A≧B, the amount of chips E acquired by the owner is determined as A−B (S12-3). Here, if A=B, the amount of chips E acquired by the owner is 0. Hence, no chips are paid to the owner. The amount of chips computed through the payout computation processing (S11) is paid to all the winning players (S12-12).

If in step S12-2 it is determined that A<B, the owner must pay a deficiency in the amount of chips to be paid to the players (i.e., B−A) from his own chips. To this end, a determination is made as to whether or not the deficiency (B−A) in payout is smaller than the total amount of chips C possessed by the owner (S12-4). If it is determined that (B−A)<C or that the deficiency can be compensated by the amount of chips possessed by the owner, the deficiency (B−A) is subtracted from the total amount of chips C possessed by the owner (S12-5). More specifically, chip amount data corresponding to the deficiency (B−A) are subtracted from the chip amount data pertaining to the owner registered in the user information database stored in the database ROM 3. Subsequently, the amount of chips computed through the payout computation processing (S11) is paid to the winning players (S12-12).

If it is determined that the method of paying chips to a casino is a deferred payment method in step S12-1, an amount determined by multiplying the total amount of chips A betted in the layout table 40 by 10% is computed as the amount of chips D to be paid as an entry fee (S12-6). A determination is then made as to whether or not the total amount of chips A betted in the layout table 40 is greater than a sum of the total amount of chips B to be paid to all the winning players and the amount of chips D corresponding to an entry fee (S12-7). If it is determined that A≧(B+D), the amount of chips E acquired by the owner is determined to be A−(B+D) (S12-8). In the case where A=(B+D), the amount of chips E acquired by the owner is 0; i.e., no chips are paid to the owner. Subsequently, the amount of chips computed through the payout computation processing (S11) is paid to the winning players (S12-12).

In contrast, if it is determined that A<(B+D) in step S12-7, the owner must pay the deficiency [(B+D)−A] from his own chips. The control section 4 acting as the overpayment determinant determines whether or not the deficiency [(B+D)−A] is smaller than the total amount of chips C possessed by the owner (S12-9). If it is determined that [(B+D)−A]<C, or that the deficiency can be compensated by the amount determined by subtracting an entry fee from the amount of chips possessed by the owner, the entry fee D and the deficiency (B−A) are subtracted from the total amount of chips C possessed by the owner (S12-5). More specifically, chip amount data corresponding to the deficiency [(B+D)−A] is subtracted from the chip amount data pertaining to the owner registered in the user information database stored in the database ROM 3. Subsequently, the amount of chips computed through the payout computation processing (S11) is paid to the winning players (S12-12).

If it is determined that (B−A)≧C or [(B+D)−A]≧C in step S12-4 or S12-9, the owner cannot compensate for the deficiency by his own chips or will lose all his chips. Hence, the owner goes broke, and owner bankruptcy processing is performed (S12-11). Through the owner bankruptcy processing, the control section 4 outputs information about bankruptcy of the owner to the respective user terminals 10. The information appears on the display 15 of the user terminal of the owner and the displays 15 of the user terminals 10 used by the players.

The control section 4 which performs owner bankruptcy processing determines the amount of chips to be awarded to the players as bonus game values. The control section 4 acting as a bonus presenter pays out chips to the winning players of the current round of game. The amount of chips is determined by adding the amount of bonus chips to the amount of payout computed through the payout computation processing (S11). In addition, the bonus chips are also paid to non-winning players (S12-12).

In the present embodiment, one of the users can participate a game as the owner and can enjoy entertainment unique to the owner, such as conducting bets with players (i.e., the other users) or serving of a roulette ball. Moreover, the users can enjoy a roulette game with a plurality of users, by operating only a user terminal of a personal computer disposed in their homes. If a user becomes the owner, the user accepts higher risks and higher potential returns than when he participates the game as a player, thus enjoying a higher degree of gambling value. Thus, a higher degree of game entertainment can be provided to users.

In the present embodiment, programs to be executed by the control section 4 of the web server 1 can be acquired while they are recorded in a recording medium such as a CD-ROM. The same also applies to programs to be executed by the control section 12 of the user terminal 10. Such programs can be acquired, by receiving a signal transmitted from a computer serving as a transmitter by way of a transmission medium, such as the communication network 20. The signal is a computer data signal embodied as a predetermined carrier wave including the program. The only essential requirement is that at least a portion of the program is transmitted through the transmission medium. In other words, there is no necessity for simultaneous transmission, over the transmission medium, of all the data constituting the program. Further, a method of transmitting a program from the computer includes a situation in which data constituting a program are transmitted continuously or intermittently.

The present embodiment has described a game system which provides a roulette game. However, the present invention can also be applied to a game system of another game involving the owner; for example, a blackjack game, a poker game, or a horserace game. When the present invention is applied to a horserace game system, there can be provided a novel game in which a user can enter a game as an owner who sponsors a racetrack and provides payout for a horserace.

If the present invention is applied to, e.g., a blackjack game system, a game proceeds while a user who has declared serves as an owner. The total points of a hand held by the owner are compared with the total points of a hand held by each of players. A player who has the hand totaling closest to the number 21 becomes a winner. If a player has won the, game, the owner pays the same amount of chips as those betted by the player or chips greater in amount than those betted by the player. If the present invention is applied to a blackjack game system, the owner draws a card, thereby determining a number of points. A game is played by comparing the number of points with the numbers of points of respective players. If the players' points have exceeded the number 21, chips betted by the players are paid to the owner before the number of points of the owner is determined. In contrast with the roulette game described in connection the preceding embodiment, in the blackjack game all the chips to be paid to players are preferably paid from the chips possessed by the owner. As in the case of the game system set forth, an obligation for paying an entry fee may be placed on the owner, even in the case of the blackjack game system.

In the present embodiment, no difference in the maximum bet a player can bet exists between a case where the owner is involved and a case where no owner is involved. When the owner is involved, the maximum bet may be changed in accordance with the amount of chips possessed by the owner or the owner's wishes. In this case, the maximum amount of payout chips; that is, a case where the highest amount of chips is paid to a player, can be computed through use of predetermined odds. Hence, the control section 4 of the web server 1 is operated as an acceptance amount limiter. The maximum bet of each slot may be limited on the basis of the maximum total amount of payout chip in accordance with the total amount of chips possessed by the owner, which is the acceptance requirement. Even when the maximum total amount of payout chips exceeds the total amount of chips possessed by the owner, the owner sends upper limit information about the maximum payout having a desired, additional upper limit added thereto to the control section 4 of the web server 1 acting as an upper-limit information receiver, by operating the user terminal 10*a*. The upper limit limited by the control section 4 acting as the acceptance amount limiter may be changed. In this case, when the owner has gone bankrupt, the operator of the roulette game site must pay chips to players. Hence, if bets for the maximum amount of payout chips betted by a player, which amount exceeds, the amount of chips possessed by the owner, are accepted, the amount of chips to be paid as an entry fee is preferably made larger than that required at an ordinary time. If the amount of bets placed by players is limited in accordance with the owner's wishes, the owner pursues progress in a game in consideration of-resources and operating tactics. Thus, there can be provided a higher degree of game entertainment.

The present embodiment has described a roulette game to be held in a web site on the Internet. However, a plurality of arcade game machines installed in a single amusement arcade or a plurality of amusement arcades may be taken as client apparatuses, and a game server may be provided so as to be connected to the client apparatuses over the network. Alternatively, some of arcade machines may be employed as the game server, and they may be interconnected by way of a network.

In the present embodiment, a roulette game is performed by the control section 4 of the web server 1. A part of a game execution program may be provided on a user terminal 10 serving as a client apparatus; thus, processing may be distributed. Moreover, a part or entirety of processing performed in the web server 1 or that performed in the user terminal 10 may be performed by another machine constituting the game system.

What is claimed is:

1. A method of performing a game in which game values are transferred between an owner and at least one player, comprising the steps of:

a) inputting a player entry request to a computer in which the game is executed via a network, the player entry request being issued from a game participant who wants to participate in the game as a player;

b) inputting an owner entry request to the computer via the network, the owner entry request being issued from a game participant who wants to participate in the game as an owner;

c) determining an owner from at least one game participant who has issued the owner entry request, in accordance with a predetermined owner requirement;

d) receiving a first amount of game values and a player-payout requirement used in the game from the game participant who has issued the player entry request;

e) executing the game while involving the player participated in the step a) and the owner determined in the step c);

f) judging whether the player satisfies the player-payout requirement, after the step e) is finished;

g) paying out a second amount of game values to the player who satisfies the player-payout requirement, the second amount of game values being determined in accordance with the first amount of game values and the player-payout requirement, and h) paying out at least a part of a total amount of the first game values received in the step d) to the owner, in accordance with a predetermined owner-payment requirement.

2. The method of performing a game as set forth in claim 1, wherein said predetermined owner payment requirement comprises an amount payable by an owner of an owner's participation fee.

3. The method of performing a game as set forth in claim 1, further comprising selecting by an owner whether a participation fee is made by a prepayment or deferred payment.

4. The method of performing a game as set forth in claim 1, wherein said predetermined owner payout requirement comprises paying nothing to the owner and subtracting from the owner's own funds where the values received in step d) are less than the amount paid out in step g).

5. The method of performing a game as set forth in claim 4, further comprising bankruptcy processing, when the owner's own funds and the values received in step d) are inadequate to pay out the amounts required to be paid out in step g).

6. A game system for performing a game in which game values are transferred between an owner and at least one player, comprising:

a game server, in which the game is executed;

at least one client apparatus, connected to the game server via a network to perform the game;

a player entry request sender provided in the client apparatus, which sends a player entry request from a game participant who wants to participate in the game as a player;

a player entry request receiver provided in the game server, which receives the player entry request;

an owner entry request sender provided in the client apparatus, which sends an owner entry request from a game participant who wants to participate in the game as an owner;

an owner entry request receiver provided in the game server, which receives the owner entry request;

an owner determinant provided in the game server, which determines an owner from at least one game participant who has issued the owner entry request, in accordance with a predetermined owner requirement;

a game value receiver provided in the game server, which receives a first amount of game values and a player-payout requirement used in the game from the game participant who has issued the player entry request;

a game executer provided in the game server, which executes the game while involving the game participant participated as the player and the game participant determined as the owner;

a game information provider provided in the game server, which provides information regarding the executed game to the client apparatus via the network;

a game information receiver provided in the client apparatus, which receives the game information provided from the game information provider;

a game presenter provided in the client apparatus, which presents the game information received by the game information receiver;

a player-payout requirement determinant provided in the game server, which judges whether the player satisfies the player-payout requirement in connection with the game executed;

a player-payout performer provided in the game server, which pays out a second amount of game values to the player who satisfies the player-payout requirement, the second amount of game values being determined in accordance with the first amount of game values and the player-payout requirement; and an owner-payout performer provided in the game server, which pays out at least a part of a total amount of the first game values received by the game value receiver to the owner, in accordance with a predetermined owner-payment requirement.

7. The game system for performing a game as set forth in claim 6, wherein said predetermined owner payment requirement comprises an amount payable by an owner of an owner's participation fee.

8. The game system for performing a game as set forth in claim 6, further comprising an owner's participation fee determinant that permits a selection between at least a prepayment or deferred payment of a participation fee.

9. The game system for performing a game as set forth in claim 6, further comprising a bankruptcy processing determinant that is engaged when the owner's own funds and the first amount of game values are inadequate to pay out the second amount of game values.

10. A recording medium provided with a program read and executed by a computer which serves as a game server for executing a game in which game values are transferred between an owner and at least one player, the program causing the computer to perform the steps of:

a) receiving a player entry request to the computer in which the game is executed via a network, the player entry request being issued from a game participant who wants to participate in the game as a player;

b) receiving an owner entry request to the computer via the network, the owner entry request being issued from a game participant who wants to participate in the game as an owner;

c) determining an owner from at least one game participant who has issued the owner entry request, in accordance with a predetermined owner requirement;

d) receiving a first amount of game values and a player-payout requirement used in the game from the game participant who has issued the player entry request;

e) executing the game while involving the player participated in the step a) and the owner determined in the step c);

f) judging whether the player satisfies the player-payout requirement, after the step e) is finished;

g) paying out a second amount of game values to the player who satisfies the player-payout requirement, the second amount of game values being determined in accordance with the first amount of game values and the player-payout requirement;

h) paying out at least a part of total amount of the game values received in the step d) to the owner, in accordance with a predetermined owner-payment requirement.

11. A game server for executing a game in which game values are transferred between an owner and at least one player, comprising:

a player entry request receiver, which receives a player entry request issued from a game participant who wants to participate in the game as a player;

an owner entry request receiver, which receives an owner entry request issued from a game participant who wants to participate in the game as an owner;

an owner determinant, which determines an owner from at least one game participant who has issued the owner entry request, in accordance with a predetermined owner requirement;

a game value receiver, which receives a first amount of game values and a player-payout requirement used in the game from the game participant who has issued the player entry request;

a game executer, which executes the game while involving the game participant participated as the player and the game participant determined as the owner;

a game information provider, which provides information regarding the executed game to the client apparatus via the network;

a player-payout requirement determinant, which judges whether the player satisfies the player-payout requirement in connection with the game executed;

a player-payout performer, which pays out a second amount of game values to the player who satisfies the player-payout requirement, the second amount of game values being determined in accordance with the first amount of game values and the player-payout requirement; and an owner-payout performer, which pays out at least a part of a third amount of game values to the owner, in accordance with a predetermined owner-payment requirement, the third amount of game values being a total amount of the game values received by the game value receiver.

12. The game server as set forth in claim 11, wherein the owner-payout performer pays to the owner a part of a rest amount of game values obtained by subtracting a fourth amount of game values from the third amount of game values, where the fourth amount of game value is a total amount of the game values paid by the player-payout performer.

13. The game server as set forth in claim 11, wherein the owner requirement is that a participant who wants to participate the game as an owner has game values not less than a predetermined amount.

14. The game server as set forth in claim 11, further comprising:

an acceptance termination request receiver, which receives an acceptance termination request from the owner to terminate a period in which the game value receiver receives the game values from the player; and an acceptance refuser, which refuses to receive the game values from the player when the acceptance termination request receiver receives the acceptance termination request.

15. A client apparatus, connected to the game server as set forth in claim 11 via the network, comprising:

a player entry request sender, which sends the player entry request;

an owner entry request sender, which sends the owner entry request;

a game information receiver, which receives the game information provided from the game information provider; and a game presenter, which presents the game information received by the game information receiver.

16. The game server for executing a game as set forth in claim 11, wherein said predetermined owner payment requirement comprises an amount payable by an owner of an owner's participation fee.

17. The game server for performing a game as set forth in claim 11, further comprising an owner's participation fee determinant that permits a selection between at least a prepayment or deferred payment of a participation fee.

18. The game server for performing a game as set forth in claim 11, further comprising a bankruptcy processing determinant that is engaged when the owner's own funds and the first amount of game values are inadequate to pay out the second amount of game values.

19. The game server as set forth in claim 11, wherein the player-payout performer pays out the second amount of game values from the third amount of game values.

20. The game server as set forth in claim 19, further comprising an overpayment determinant which judges the fourth amount of game values exceeds the third amount of game values, wherein the player-payout performer pays out an excess amount of game values from game values possessed by the owner when the overpayment determinant judges the fourth amount of game values exceeds the third amount of game values.

21. The game server as set forth in claim 20, further comprising a bonus presenter which presents bonus game values to the player when the second amount of game values exceeds the game values possessed by the owner.

22. The game server as set forth in claim 20, further comprising an acceptance amount limiter which delimits an upper limit of the first amount of game values in accordance with a predetermined acceptance requirement.

23. The game server as set forth in claim 22, further comprising an upper-limit information receiver, which receives an upper limit information issued from the owner for determining the upper limit of the first amount of game values, wherein the acceptance amount limiter utilizes the upper limit information as the acceptance requirement.

24. The game server as set forth in claim 11, wherein the player-payout performer pays out the second amount of game values from game values possessed by the owner.

25. The game server as set forth in claim 24, further comprising a bonus presenter which presents bonus game values to the player when the second amount of game values exceeds the game values possessed by the owner.

26. The game server as set forth in claim 24, further comprising an acceptance amount limiter which delimits an upper limit of the first amount of game values in accordance with a predetermined acceptance requirement.

27. The game server as set forth in claim 26, further comprising an upper-limit information receiver, which receives an upper limit information issued from the owner for determining the upper limit of the first amount of game values, wherein the acceptance amount limiter utilizes the upper limit information as the acceptance requirement.

* * * * *